US007206844B2

(12) United States Patent
Gupta et al.

(10) Patent No.: US 7,206,844 B2
(45) Date of Patent: *Apr. 17, 2007

(54) METHOD FOR LOCATING AND RETAINING NEW SOFTWARE AND DEPENDENCIES ON A LOCAL SERVER BY EXAMINING A PROPERTY FILE OF THE NEW SOFTWARE

(75) Inventors: Abhay K. Gupta, Milpitas, CA (US); Alejandro Abdelnur, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 10/875,905

(22) Filed: Jun. 24, 2004

(65) Prior Publication Data

US 2005/0021759 A1    Jan. 27, 2005

Related U.S. Application Data

(63) Continuation of application No. 09/267,794, filed on Mar. 12, 1999, now Pat. No. 6,868,448, which is a continuation-in-part of application No. 09/106,868, filed on Jun. 29, 1998, now Pat. No. 6,446,109.

(51) Int. Cl.
    *G06F 15/173* (2006.01)

(52) U.S. Cl. .................. 709/226; 709/203; 709/219; 709/225; 709/229; 709/232; 718/105; 717/178

(58) Field of Classification Search .............. 709/217, 709/219, 225–226, 229, 203, 232; 718/105; 717/177, 178

See application file for complete search history.

(56) References Cited

U.S. PATENT DOCUMENTS 5,642,515 A    6/1997    Jones et al.

(Continued)

FOREIGN PATENT DOCUMENTS

EP    0 384 339    8/1990

OTHER PUBLICATIONS

"Locale Object Server for Network Computing", IBM Technical Disclosure Bulletin, Feb. 1997, pp. 205-207, vol. 40, No. 2, IBM Corp., New York.

(Continued)

*Primary Examiner*—Saleh Najjar
*Assistant Examiner*—Oanh Duong
(74) *Attorney, Agent, or Firm*—Kent A. Lembke; William J. Kubida; Hogan & Hartson LLP

(57) ABSTRACT

A method for distributing code resident on a remote application server to a local server. When a client requests information, a request handler on the local server handles the request. If the information is available on the local server, the request handler satisfies the request using this information. If the information is not available locally, the request handler accesses the remote application server to obtain the requested information. The request handler forwards the information to the client and caches it on the local server. Where the information cannot be transferred to the local application server, the request handler establishes a proxy to the remote application server that forwards a client request to the remote application server and a response from the remote application server to the client. The client communicates transparently with the remote application server via the proxy on the local application server.

24 Claims, 11 Drawing Sheets

U.S. PATENT DOCUMENTS

| | | | |
|---|---|---|---|
| 5,774,660 A | | 6/1998 | Brendel et al. |
| 5,790,789 A | | 8/1998 | Suarez |
| 5,797,010 A | | 8/1998 | Brown |
| 5,826,024 A | | 10/1998 | Higashimura et al. |
| 5,857,201 A | | 1/1999 | Wright, Jr. et al. |
| 5,862,344 A | | 1/1999 | Hart |
| 5,875,322 A | | 2/1999 | House et al. |
| 5,878,218 A | | 3/1999 | Maddalozzo, Jr. et al. |
| 5,881,230 A | | 3/1999 | Christensen et al. |
| 5,883,626 A | | 3/1999 | Glaser et al. |
| 5,889,520 A | | 3/1999 | Glaser |
| 5,951,694 A | * | 9/1999 | Choquier et al. ............. 714/15 |
| 6,067,580 A | * | 5/2000 | Aman et al. ................ 719/330 |
| 6,092,105 A | * | 7/2000 | Goldman .................... 709/217 |
| 6,134,581 A | | 10/2000 | Ismael et al. |
| 6,138,009 A | | 10/2000 | Birgerson |
| 6,148,340 A | | 11/2000 | Bittinger et al. |
| 6,167,567 A | | 12/2000 | Chiles et al. |
| 6,185,619 B1 | | 2/2001 | Joffe et al. |
| 6,202,207 B1 | | 3/2001 | Donohue |
| 6,282,709 B1 | | 8/2001 | Reha et al. |
| 6,381,742 B2 | * | 4/2002 | Forbes et al. ............... 717/176 |
| 6,993,759 B2 | * | 1/2006 | Aptus et al. ................ 717/170 |
| 7,096,253 B2 | * | 8/2006 | Vinson et al. ............. 709/203 |
| 7,127,526 B1 | * | 10/2006 | Duncan et al. ............. 709/249 |
| 2002/0116702 A1 | * | 8/2002 | Aptus et al. ................ 717/170 |

OTHER PUBLICATIONS

Pai et al., "Locality-Aware Request Distribution in Cluster-Based Network Servers", ACM Sigplan Notices, Nov. 1998, pp. 205-216, vol. 33, No. 11, Association for Computing Machinery, New York.

"Local Area Network Server Replacement Procedure", IBM Technical Disclosure Bulletin, Jan. 1995, pp. 235-236, vol. 38, No. 1, IBM Corp., New York.

Sinha, A., "Client-Server Computing", Communications of the Association for Computing Machinery, Jul. 1992, pp. 79-98, vol. 35, No. 7, Association for Computing Machinery, New York.

Van Hoff et al., "The HTTP Distribution and Replication Protocol", available from http://www.w3org./TR/NOTE-drp (visited Jan. 17, 2001).

Radosevich, Lynda, "Marimba, friend support data replication protocol", Infoworld, Framingham, Sep. 1, 1997, pp. 1-2.

"Distributed Systems Concepts and Design", Addison-Wesley, Third Edition 2001, by Coulouris et al., ISBN 0201-61918-0, p. 36.

http://lists.w3.org/Archives/Public/www-proxy/msg00294.html.

http://lists.w3.org/Archives/Public/www-jigsaw/1997JulAug/0028.html.

"The Java Servlet API", Tutorials & Code Camps, MageLang Institute, Sun Microsystems, Inc., http://java.sun.com/products/servlet/, 1998, pp. 1-17.

Erdos, Marlena, Hartman, Bret, Mueller, Marianne, "Security Reference Model for the Java Developer's Kit 1.0.2", Java Security Reference Model, http://java.sun.com.security/SRM.html, Nov. 13, 1996, pp. 1-12.

"Secure Computing with Java: Now and the Future", White Paper, Sun Microsystems, Inc., http://java.sun.com, pp. 1-19.

* cited by examiner

METHOD FOR LOCATING AND RETAINING NEW SOFTWARE AND DEPENDENCIES ON A LOCAL SERVER BY EXAMINING A PROPERTY FILE OF THE NEW SOFTWARE

CROSS-REFERENCE TO RELATED APPLICATIONS

This is a continuation of application Ser. No. 09/267,794, filed Mar. 12, 1999 now U.S. Pat. No. 6,868,448, which is a continuation-in-part of application Ser. No. 09/106,868, filed Jun. 29, 1998 and issued as U.S. Pat. No. 6,446,109.

BACKGROUND OF THE INVENTION

1. Field of the Invention

This invention relates to computing systems, and more particularly to the architecture and environment for computing and applications executing therein.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, SPARC, Java, JavaBeans and all Java-based trademarks and logos are trademarks or registered trademarks of Sun Microsystems, Inc. in the United States and other countries.

2. Background Art

Computers are used to send and receive data using a transport mechanism or communications network. The Internet is one example of a transport mechanism and other examples include local area networks (LANs) and wide area networks (WANs). Using a network, a software application (a sender) that resides on one computer system can exchange information (e.g., corporate data or executable code) with a software application (a receiver) that resides on a remote computer system, for example. The exchange of information between computers typically occurs between a "server application" that provides information or services, and a "client application" that receives the provided information and services.

A problem with existing server applications is that they must be pre-configured to include the information that they are to provide to a client application (they cannot be configured dynamically). Additionally, files that are needed, to execute an application are transferred one at a time as they are needed thereby delaying the execution time for various applications. Thus, instead of having all files that are utilized by an application transferred prior to execution (thereby expediting the actual execution), each file is transferred as it is needed. Further, when information or an application is updated, the updates have to be manually retrieved and installed. Additionally, disk space on a server must be managed by a user to relieve disk space for further use. Issues such as transmission efficiency and security are raised when information is exchanged between computers. Transmission inefficiencies are especially apparent where information is communicated over a long distance and/or lower speed or bandwidth lines. Further, where a transmission is being received by a computer system, security measures are typically used to ensure that the transmitted information (e.g., program code) does not corrupt the computer system. Unfortunately, security measures can restrict access to the computer system's resources which can hinder an application's efficiency and usability.

As will be discussed below, computing environments that use an application architecture initially developed for use with the Internet can be significantly affected by the type of medium used to form the Internet connection. The type of connection that a user has to the Internet can impact the speed at which information is transmitted.

The application architecture that is typically used in the Internet environment is referred to as a three-tier application architecture, or three-tier architecture. The three-tier architecture was originally designed to allow a client to have access to data and applications. In this architecture, a client communicates requests to a server for data, software and services, for example. The three-tier architecture includes a database tier that includes a database server, an application tier that includes an application server and application logic (i.e., software application programs, functions, etc.), and a client tier. The application server responds to application requests (e.g., a request for a software applet, etc.) received from the client. The application server forwards data requests to the database server.

The number of tiers that are required for an application may vary. For example, a calculator application might only involve the client tier. That is, if the calculator application software and data are resident on the client, there is no need to access the application or database tiers. An application that makes use of persistent storage such as a word processing application and the documents created therein may involve both the client and the application tiers. An enterprise's application (e.g., an accounting or personnel) application may involve all three tiers as data that is used by the application may be stored in a database.

FIG. 1 provides an overview of a three-tier architecture. Client tier 102 typically consists of a computer system that provides a graphic user interface (GUI) generated by browser 106. Browser 106 generates a display from a specification of GUI elements (e.g., a file containing input, form, and text elements defined using the Hypertext Markup Language (HTML) and/or by an applet (i.e., a program such as a program written using the Java programming language that runs when it is loaded by the browser).

Application server 110 is pre-configured to include those applications that are needed by its clients. In an effort to keep the size of the client minimal or "thin," applets that are executed in client tier 102 generally do not include any significant application logic. Application server 10 is pre-configured to include the application logic that is not included in client tier 102. The majority of an application's functionality is performed by the application logic that resides on and is managed by application server 1 10 in application tier 116. Database tier 118 contains the data that is accessed by the application logic in application tier 116. Database server 112 manages the data, its structure and the operations that can be performed on the data and/or its structure.

Application server 110 and database server 112 reside in production data center 108. Application server 110 can be pre-configured with applications such as a corporation's accounting, personnel and payroll applications, for example. Application server 110 manages requests directed to the applications that are stored on application server 110. Database server 112 manages the database(s) that manage data for applications. Database server 112 responds to request to access the accounting, personnel and payroll applications' data, for example.

Connection 104 is used to transfer code, data, and graphical user interface layer to client tier 102 and to transmit enterprise data between client tier 102 and production data center 108. The client tier can communicate with the application tier using various protocols including HTTP (Hyper-Text Transfer Protocol), HTTPS (Secure Hyper Text Transfer Protocol), Socket, CORBA, or an RMI (a Remote Method Invocation) application programming interface (API) available from Sun Microsystems. The RMI API provides the ability to invoke methods, or software modules, that reside on another computer system. Parameters are packaged (or marshalled) and unpackaged (or unmarshalled) for transmittal to and from the client tier. Connection 114 represents the transmission of requests for data and the responses to such requests from applications that reside in application server 11O.

In a typical computing environment, production data center 108 is located at a centralized site. In this way, applications can be centrally managed such that updates can be made and a standardized application base can be provided to users. However, an application's users can be spread across a wide geographical area. Thus, client tier 102 is not necessarily located at the same site or proximately connected to application server 110 (e.g., via a local area network, or LAN). Information may be transmitted, for example, via a wide area network (WAN) or the Internet that involve remote transmissions (e.g., overseas) and lower bandwidth communication technologies (e.g., modem) which can result in unacceptable transmission times. Transmission times are of concern since both data and application code may be transmitted between client tier 102 and application server 110 in the three-tier architecture.

The three-tier architecture can be used with various types of networks (e.g., Internet and intranet). Typically, client tier 102 communicates with production data center 108 via browser 106 which issues a request of application server 110. The client can request a resource that is identified by a uniform resource locator (URL) designation. For example, the URL can identify a page definition (e.g., an HTML document) that browser 106 uses to generate a display, or the URL can identify page definition with an embedded applet (i.e., executable program code) that-is run inside browser 106).

The information that is represented by a URL is downloaded to client tier 102. Thus, if a corporate application requires multiple downloads (e.g., multiple page definitions and/or applets) to run within client tier 102, the downloading process is inefficient when application server 110 is remote and/or slower transmission rates are used. Web applications (where the client is using a browser as the application container), often do not store code, nor data in the disk on client tier 102. All information is retrieved from the application server 110 every time. Further, when information may be stored within client tier 102 (for example when a client is the tuner Castanet product available from Marimba discussed below), the information downloaded to client tier 102 may occupy a significant amount of client tier 102's disk space. To free up memory and disk space on client tier 102, a user has to manually delete unused applications.

One type of application that can be used for distributing, updating, and managing business applications and accompanying information on the client is the Castanet product available from Marimba. The Castanet product consists of a tuner (client software that resides on the desktop or computing device) and transmitter (server software). A tuner can receive, install, and launch applications automatically without intervention. When a network connection is available, the tuner looks for updates to the installed applications and selectively downloads only the information that has changed. The transmitter distributes and updates applications over a network. Information and applications distributed and managed by the Castanet product through the transmitters and receivers are referred to as channels. Thus, the Castanet product may be utilized to distribute and, manage channels. However, the tuner for the Castanet product is required in order to receive the transferred information.

Security measures adopted for use with the application architecture limit the applications that have been developed according to this architecture. For example, an application's efficiency and/or usability can be impacted as a result of security measures. Further, there are issues of security concerning the transmission of information. From the perspective of client tier 102, for example, it is necessary to ensure that the information that is being received is "trusted." That is, it is important to ensure that client tier 102 is not corrupted by unauthorized software executing in client tier 102. ^Further, it is important to ensure that a client that attempts to access production data center 108 can be trusted with the corporation's data and applications.

Optimally, client tier 102 executes only those applets that have been received from a known and trusted source (e.g., production data center 108). A level of trust can be achieved between a client tier 102 and production data center 108 such that data and applets can be transmitted freely between client tier 102 and production data center 108. However, this paradigm is limiting and does not always occur in practice. Browser 106 may request an applet from a source other than production data center 108, for example. If an applet is allowed to execute unchecked in client tier 102, it introduces the potential for serious breaches of security and/or malicious access to the data and resources.

Security models or approaches have been adopted to limit the damage that may be caused by a breach of security and maliciousness. One such security approach, referred to as the sandbox security model, limits the access given to applets from an "untrusted" (i.e., unknown) source to only its namespace (e.g., operating system-assigned boundaries of a program such as the addressable memory). For example, normally, applets run within a browser's sandbox model, due to which the applets are not allowed to access any local resources like file systems and printers. The only way to access file systems and printers is from the application server which is normally in a remote location. Such a solution is not efficient and may not provide access to resources close to a client. Under the sandbox model, one solution to this problem is to use signed applets that make the applets trusted, thereby allowing the applets to use the local resources. Further, when applets are downloaded from an application server, the applets can only communicate with the application server. Thus, it is not possible to share services by applets downloaded from different application servers.

An "untrusted" applet or software program is allowed to access only memory or other computer resources that are in its namespace. By limiting an "untrusted" applet to its own namespace, the applet can be prohibited from modifying areas of memory assigned to other applets or applications, for example.

Further, an applet may be prohibited from establishing a connection to (and/or downloading code from) a server (e.g., file or printer servers) other than the one from which it was retrieved. Client tier 102 may be forced to access another server via application server 110. To make a request of a, file server, for example, client tier 102 sends the request to application server 110 which forwards the request to the file server. This is inefficient particularly when the file server adjacent to client tier 102.

Further, in the sandbox approach, printing is accomplished by displaying material to be printed in browser 106 and relying on the user to print the material using the print functionality available in browser 106.

The sandbox approach has clear disadvantages. An applet that is confined to its namespace cannot access information that is stored in a local file system. Further, confined applets cannot pool or share resources such as memory.

Another security approach uses signatures or other forms of certification to certify that an applet is from a known source. An "untrusted" applet can become a "trusted" applet, if its digital signature can be verified by, for example, client tier 102. Verification can be accomplished with digital signatures using a public key/private key encryption technique. The recipient of the information (e.g., client tier 102) uses the digital signature and a public key (a key generated from the private key and distributed to the public) to verify the digital signature thereby verifying the information.

Signed applet support is not provided by all clients. To support digitally signed applets, it is necessary for client tier 102 to include the ability to verify the signature. Many currently available browsers do not have such a capability.

In addition to the efficiency, memory, and security issues, in the three-tier model each application must log in to application server 110 separately. There is no ability to store user information (e.g., profile information) in client tier 102 or elsewhere so that it can be used for subsequent applications.

SUMMARY OF THE INVENTION

One or more embodiments of the invention comprise a computing environment that offers a level of decentralization wherein application code resident on a remote application server can be distributed to a local server, or local application server, that services a client. A local application server can be dynamically configured to serve its clients based on requests for application code and/or services. Further, if application code that is downloaded to a client from the local application server cannot be trusted, access to the local application server's resources may not be given to the downloaded application code. Efficiencies can be achieved for the transmission of information.

Using embodiments of the invention, it is not necessary to pre-configure the local application server to satisfy a request of the server. The local application server can be configured dynamically (e.g., as needed) in response to requests. For example, there is no need to install application code or services on the local application server in anticipation of a request. If the local application server is not configured to handle a request, the local application server dynamically configures itself to satisfy the request.

A request for information, such as application code (e.g., an applet) by a client, can be serviced by the local application server with its existing configuration or a new configuration. Further, by using the local server, it is possible to access local resources in an efficient way from the local server without using signed applets (which requires a costly infrastructure and certificates management). Thus, all of the applets are downloaded from the local server regardless of the application server. Proxies are installed in the local server and communicate with the application servers. Therefore, it is possible for applets to share services in the network using the proxies downloaded in the local server. Further, because the user downloads all of the applets from the local server, the application server locations and URLs are transparent to the user, and from the user perspective, all applications are local. Consequently, from the applet perspective, all services are available on the local server, and the resource locator/handler (discussed below) running in the local server downloads the proxies for the actual services and makes the locations transparent for the applet. In addition, since the applet is obtaining all services from the local server, a signed applet infrastructure is not required.

One or more embodiments provide for a request handler to manage a client's requests and ensure that needed files and applications are installed. If the local application server's configuration includes the requested application code, the local application server satisfies the request using its existing configuration. If the local application server's configuration does not include the requested application code, the local application server (through the request handler) attempts to locate the requested application code (e.g., from another application server). When the requested application code is located, it is transferred to the local application server. The local application server retains a copy of the application code and forwards a copy to the client. Thus, if a subsequent request is made for the application code, it can be satisfied by the local application server (without accessing another application server).

Further, a complete set of the files needed to run an application are downloaded and installed rather than one file at a time as needed for a particular application.

The local application server can further be dynamically configured with services that can satisfy a client request. When a service request is received from the client, the local application server attempts to satisfy the request using a service that resides on the local application server. If the requested service is resident on the local application server, the local application server forwards the request to the service. There is no need to reconfigure the local application server.

If a request is for a service for which the local application server is not already configured, the local application server (through the request handler) determines whether the service resides elsewhere (e.g., on another server). If the local application server finds the service, it determines whether the service can be acquired from its current location. If so, the service is copied to the local application server and is used to satisfy the client's request.

Where the requested service cannot be transferred to the local application server, the local application server establishes a proxy for the service. The proxy resides on the local application server and forwards the client request to the service that resides on the other application server. If a response is generated by the service, the response is sent to the proxy on the local application server and forwarded to the client. Thus, where a proxy is used, the client need not be aware of the service's actual location. The client is unaware that the requested service does not reside on the local application server.

In embodiments of the invention, the local application server includes a resource locator (also referred to as a request handler), a download service and one or more local services. The resource locator is used by the local application server to locate application code and services (respectively) when a request is made that cannot be satisfied using the local application server's current configuration. Services that are downloaded to the local application server can be used by the local application server to satisfy a request.

The local application server can be configured with proxy services as needed. A proxy service acts a proxy for a service that resides elsewhere (e.g., on another server). A proxy service is used when, for example, a service cannot be transferred to the local application server. A service request is forwarded by the proxy service to the service. The service sends a response, if any, to the proxy service for forwarding to the requester.

The local application server can be configured with application software as needed. When, for example, a client requests application code, the local application server can obtain the application code, if it does not already have the requested application code. Application code that is acquired by the local application server is retained and can be used to satisfy a subsequent request for the application code, if any.

The local application server can be configured to include local services such as print, file, login or profile services that can be shared by multiple applications. Where the local application is configured to include local services, a client request for a local service is forwarded by the local application server to the local service.

One such local service allows a client to log in to the local application server. During a login process, the client establishes its identity which is stored on the local application server and can be used for multiple applications and information requests. The local server generates a credential for the client that can be used to authorize access to any application server and/or service requested by the client.

In embodiments of the invention, applications and information that has been updated at a remote server are automatically updated on the local application server. Further, disk space and memory are managed automatically such that unused applications are removed from the local application server.

DETAILED DESCRIPTION OF THE INVENTION

An enterprise computing environment is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Enviroment (Hardware)

Figure 2:
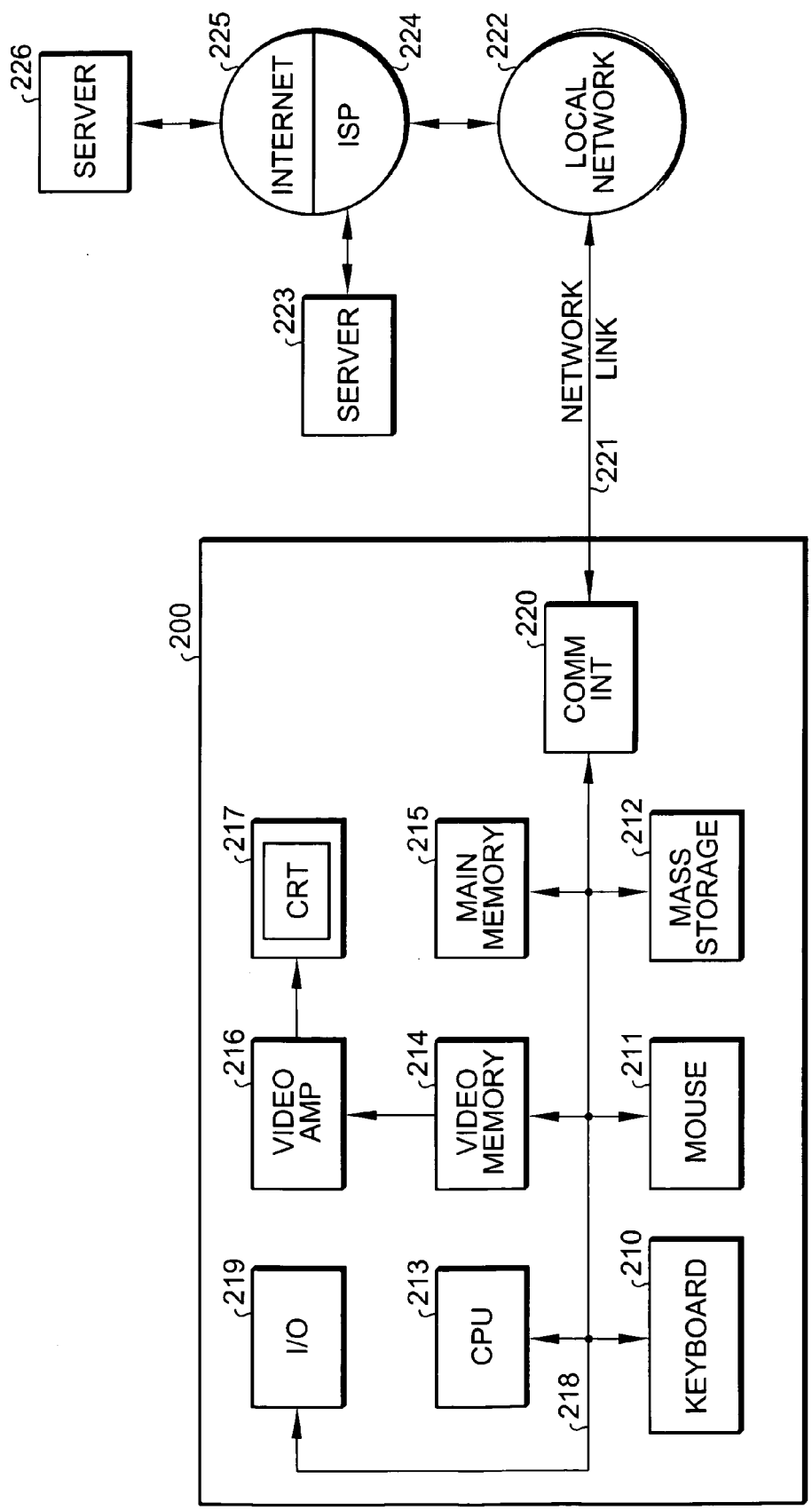
FIG. 2 is a block diagram of an embodiment of a computer system capable of providing a suitable execution environment for an embodiment of the invention.

An embodiment of the invention can be implemented as computer software in the form of computer readable program code executed on a general purpose computer such as computer 200 illustrated in FIG. 2, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 210 and mouse 211 are coupled to a system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to system bus 218 represents such I/O elements as a printer, A/V (audio/video) I/O, etc.

Computer 200 includes a video memory 214, main memory 215 and mass storage 212, all coupled to system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 64-bit data bus for transferring data between and among the components, such as processor 213, main memory 215, video memory 214 and mass storage 212.

Alternatively, multiplex data/address lines may be used instead of separate data and address lines. In one embodiment of the invention, the processor 213 is a microprocessor manufactured by Sun Microsystems, Inc., such as a SPARC microprocessor, or a microprocessor manufactured by Motorola, such as the 680x0 processor, or a microprocessor manufactured by Intel, such as the 80x86, or Pentium processor. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN.

Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the application computing environment described herein.

The received code may be executed by processor 213 as it is received, and/or stored in mass storage 212, or other non-volatile storage for later execution. In this manner, computer 200 may obtain application code by way of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer system described above is for purposes of example only. An embodiment of the invention may be implemented in any type of computer system or programming or processing environment.

Four-Tier Architecture

Figure 1:
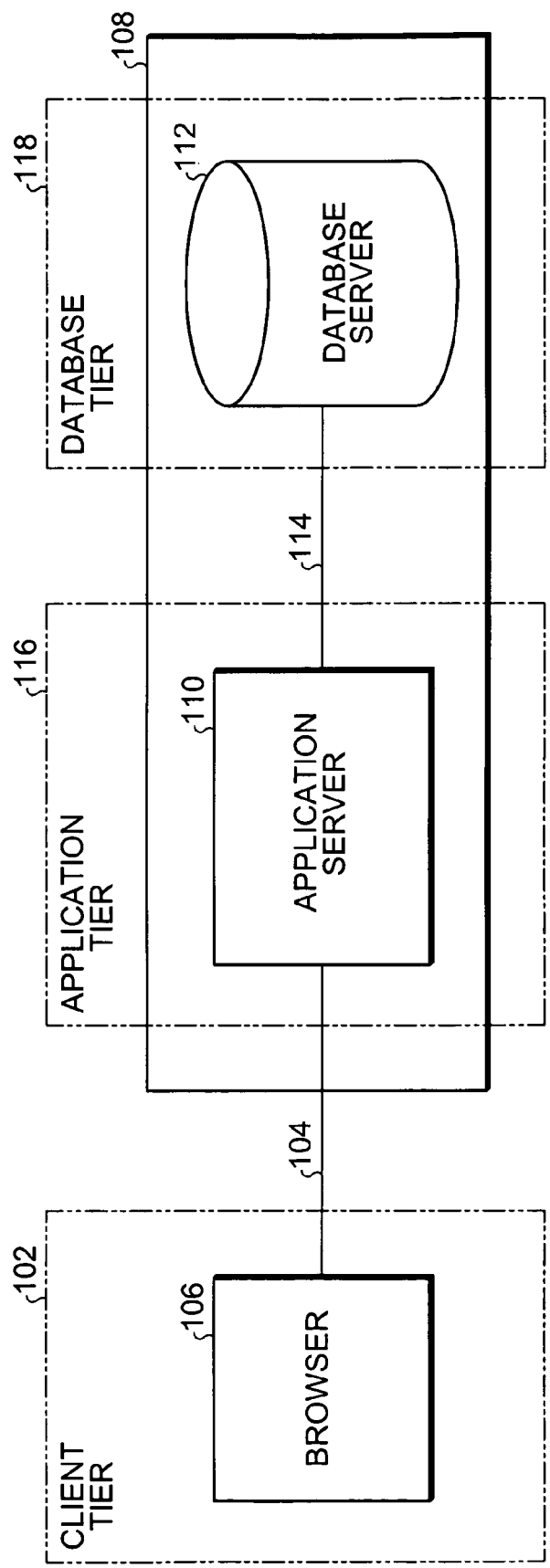
FIG. 1 provides a block diagram of a three-tier computing architecture.

One or more embodiments of the invention comprise a computing environment that offers a level of decentralization wherein information needed by a client can be cached at local application servers referred to as webtop servers. A webtop server can be, for example, an instance of computer 200. Webtop servers also provide access to local and remote network services. Thus, a client accesses a webtop server instead of a remote server such as, for example, application server 110 that resides in production data center 108 of FIG. 1.

Figure 3:
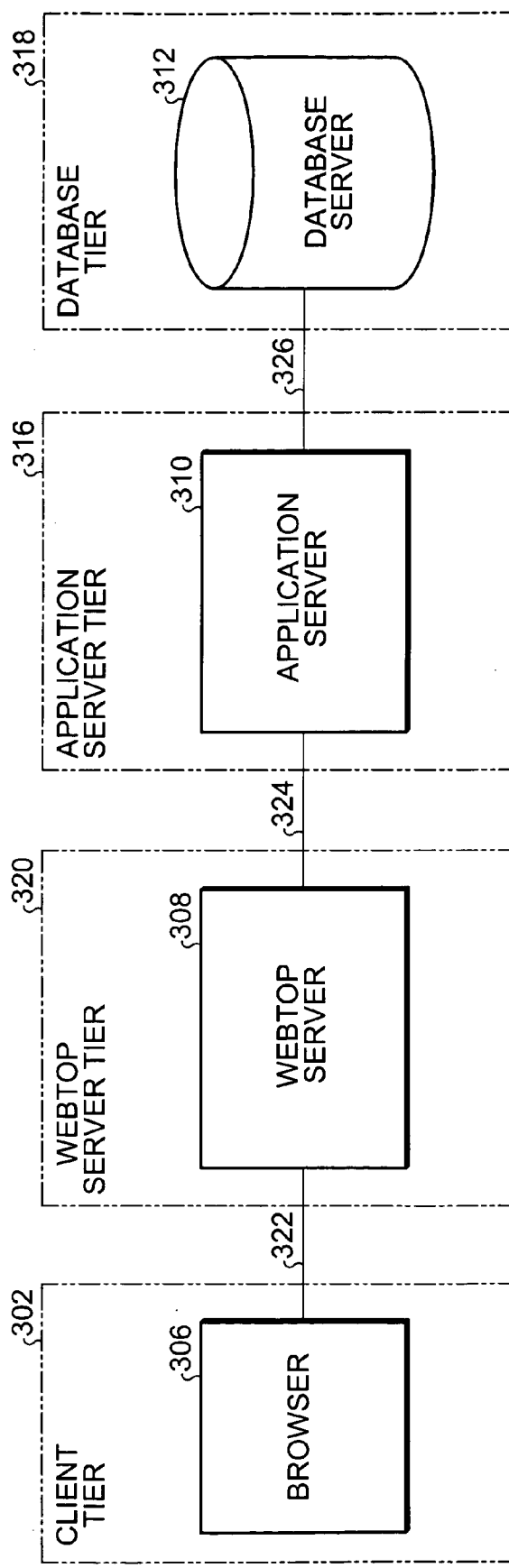
FIG. 3 is provides a block diagram of a four-tier architecture according to one or more embodiments of the invention.

In one or more embodiments of the invention, a webtop server is included in a four-tier application architecture (or four-tier architecture) as illustrated in-FIG. 3. As in the three-tier architecture, client tier 302 provides a graphic user interface (GUI). The GUI can be written as a Java applet which runs from browser 106 or any Java enabled environment such as is provided on network computers. Browser 306 runs in client tier 302 which is comprised of an instance of computer 200 in an embodiment of the invention. The software program functionality or logic that is executed in client tier 302 can be minimized to limit the size of the programs that must be transmitted to client tier 302. This facilitates the deployment of client software to the clients that implement client tier 306.

Application server 310 resides in application server tier 316. Application server 310 manages requests for application logic and is responsible for database transaction handling with database server 312 that is in database tier 318. Database server 112 is responsible for storing application data in a persistent store such as a relational database (RDB) or an object-oriented database (OODB), for example. Database server 112 responds to a request to access accounting, personnel and payroll applications' data, for example. In an embodiment of the invention, application server 310 and database server 312 are instances of computer 200.

Application server 310 and database server 312 can be resident in a production data center that is remote to a client in client tier 302. A client in client tier 302 communicates its requests to webtop server 308 in webtop server tier 320. Webtop server 308 can support multiple clients. Webtop server 308-caches applets and/or static data that are needed by a client. Further, webtop server 308 manages services which provide access to network resources need by a client (e.g., file system and printer resources).

In an embodiment of the invention, communication link 322 between a client in client tier 302 and webtop server 308 uses both the Hypertext, Transmission Protocol (HTTP) and Remote Method Invocation (RMI). Similarly, communication link 324 between webtop server 308 and application server 310 uses both HTTP and RMI. In one or more embodiments of the invention, communication link 324 between webtop server 308 and application server 310 uses the Castanet product to transmit information (channels) from webtop server 308 to application server 310 and vice versa. Alternatively, instead of the Castanet product, an HTTP Distribution and Replication Protocol (DRP protocol) may be utilized. Using DRP, a client can download only the data (or application) that has changed since the last time the client checked (i.e., only the differences are downloaded). The DRP protocol uses content identifiers to automatically share resources that are requested more than once (thereby eliminating redundant transfers of commonly used resources). Additionally, the DRP protocol uses a data structure called an index that describes meta data (e.g., the exact state of a set of data files). The DRP protocol is more fully described in the document entitled "The HTTP Distribution and Replication Protocol" (1997) available at "http://www.w3.org/TR/NOTE-drp". It should be apparent, however, to one of ordinary skill in the art that other communication techniques and/or protocols can be used for communication links 322 and 324.

In one embodiment of the invention, communication link 322 between application server 310 and database server 312 uses a Java Database Connectivity (JDBC) Application Program Interface (API) that is available, from Sun Microsystems, Inc. It should be apparent, however, to one of ordinary skill in the art that other database interfaces can be used for communication link 326.

Webtop server 308 caches data and applets for use by a client. Initially, webtop server 308 is empty without any information maintained. When a client accesses an application for the first time, webtop server 308 retrieves and stores the program software from application server 310. Subsequent requests for the application software can be satisfied using the program software stored in webtop server 308. Where the program software is written as Java applets, webtop server 308 becomes the applet-host once the applets are transferred from application server 310. Thus, when the applet is executed on the client, the applet can communicate back to webtop server 308 as the host of that applet thereby satisfying the sandbox security paradigm.

Other program software that can be transmitted to webtop server 308 includes servlets. A servlet is a software program that is written in, the Java programming language (or any other programming language) and runs on a server. A servlet can be invoked by a client via a name or a URL, for example. Servlets can be used to write application services that comprise application server tier 316, for example. An applet running on a client requests the handle for a servlet (e.g., a URL) from webtop server 308. If the servlet does not already reside at webtop server 308, webtop server 308 can obtain the servlet from application server 310 and send the service's handle to the client.

When a request is received by a servlet, the servlet can either satisfy the request locally or forward the request (or some portion of it) to another service. For example, file system and printing requests can be handled by services that reside on webtop server 308.

Figure 4A:
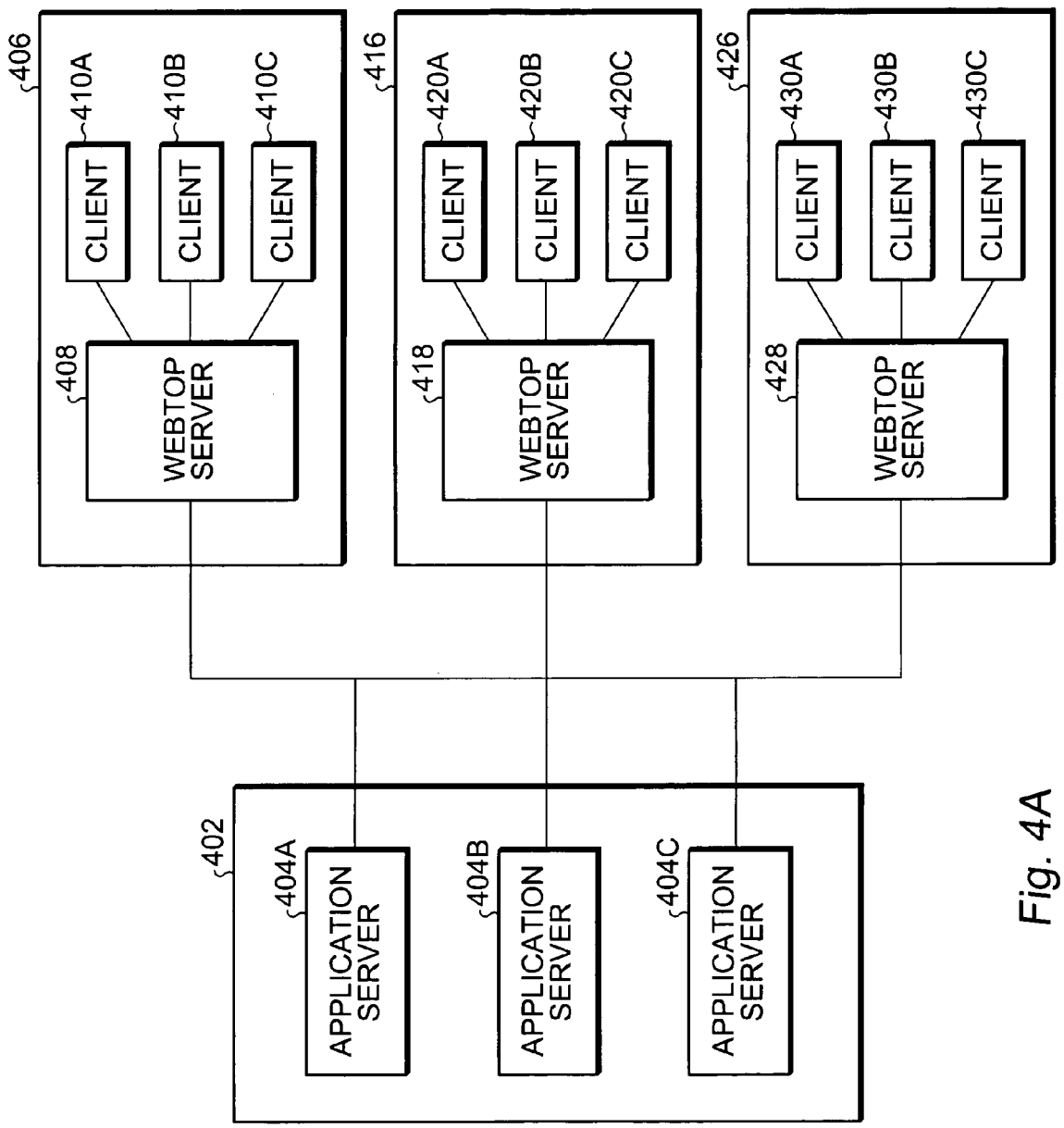
FIG. 4A illustrates a portion of a four-tier architecture with localized servers accessing application servers according to an embodiment of the invention.

FIG. 4A illustrates a portion of the four-tier architecture with localized servers accessing application servers according to an embodiment of the invention. In the four-tier architecture, the server with which a client interface can be located more conveniently and proximately located to the client. Application servers 404A–404C are resident in production data center 402 which can be located in a remote geographic location with regard to clients 410A–410C, 420A–420C and 430A–430C. It should be apparent that application servers 404A–404C can reside at the same or separate data centers, however.

Clients 410A–410C, 420A–420C and 430A–430C reside at sites 406, 416 and 426 (respectively). Using embodiments of the invention, it is unnecessary for sites 406, 416 and 426 and their clients 410A–410C, 420A–420C and 430A–430C to be proximately located with reference to production data center 402. Webtop servers 408, 418 and 428 reside at sites 406, 416 and 426 (respectively) and are dynamically configured to handles requests such as those received from clients 410A–410C, 420A–420C and 430A–430C. Application software and services requested by clients 410A–410C, 420A–420C and 430A–430C can reside on webtop servers 408, 418 and 428 respectively.

Webtop server 408 can reside in the same building or campus as clients 410A–410C, for example. Similarly, webtop servers 418 and 428 can be proximately located to clients 420A–420C and 430A–430C, respectively. Clients 410A–410C, 420A–420C and 430A–430C interact with webtop servers 408, 418 and 428, respectively.

When a client requests application software or a service that is not resident on the webtop server, the webtop server can obtain the request software or service from the production data center 402. When a client requests software that has already been cached on the webtop server, the software can be downloaded to the client without interfacing with production data center 402. A service that is resident on a webtop server can be used to satisfy a client's request for that service. Thus, the need to access application servers 404A–404C in production data center 402 is minimized. This is advantageous particularly when an inefficient mode of communication would otherwise need to be used between production data center 402 and clients 410A–410C, 420A–420C and 430A–430C.

Figure 4B:
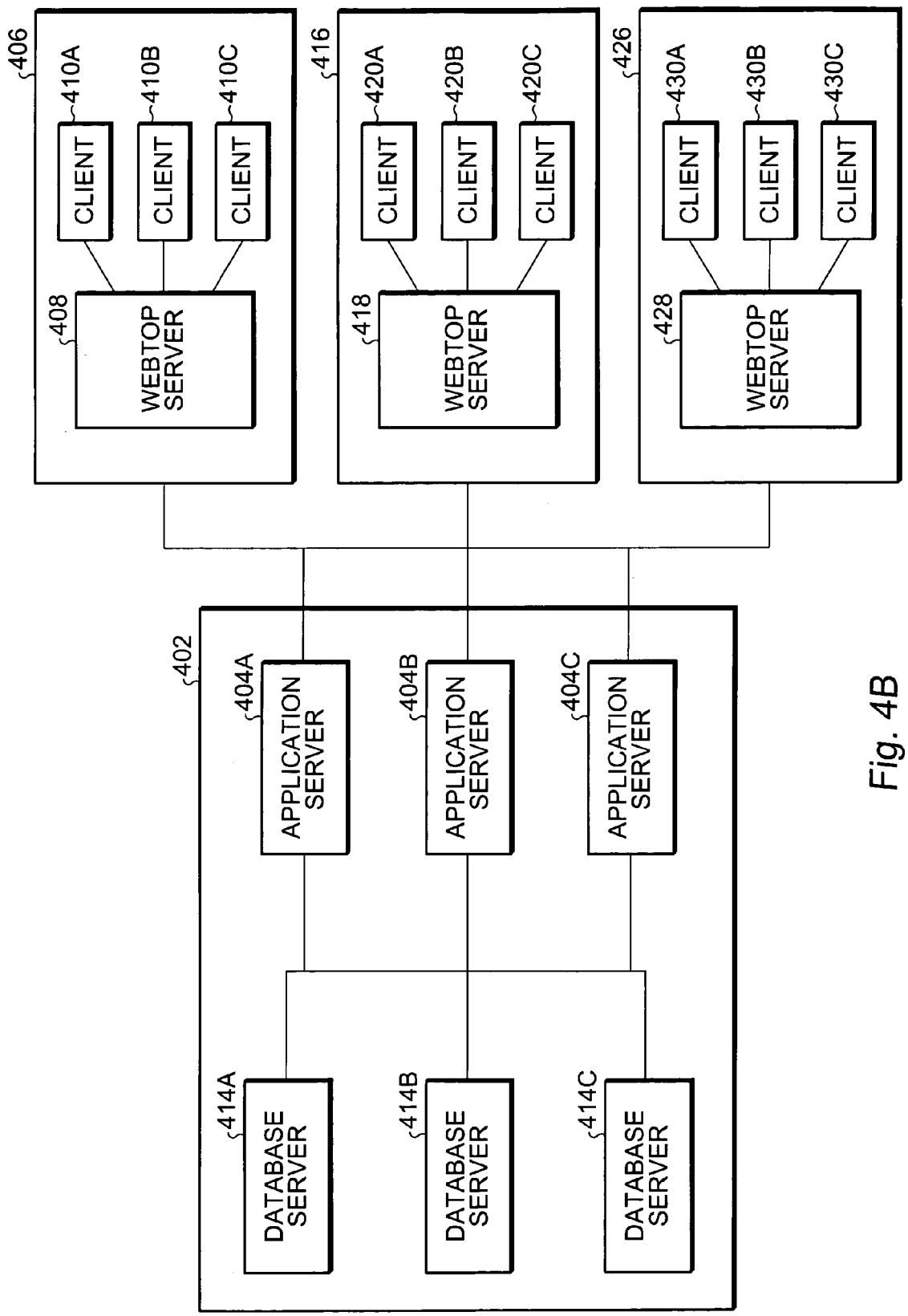
FIG. 4B illustrates a four-tier architecture with localized servers according to an embodiment of the invention.

FIG. 4B illustrates a four-tier architecture with localized servers according to an embodiment of the invention. Production data center 402 comprises application servers 404A–404C and database servers 414A–414C. While application servers 404A–404C and database servers 414A–414C are depicted as residing at the same production data center (i.e., production data center 402), it should be apparent that application servers 404A–404C and database servers 414A–414C can reside at separate instances of production data center 402.

Application servers 404A–404C forward requests for stored data (e.g., stored in a database) to database servers 414A–414C. A response received from one of database servers 414A–414C is forwarded by one of application servers 404A–404C. Thus, for example, a request for data initiated by client 410A residing at site 406 is forwarded to webtop server 408. Webtop server 408 forwards the request to one of the application servers at production center 402 (e.g., application server 404A). Application server 404A forwards the request to the appropriate database server (e.g., database server 414A). Database server 414A processes the request and responds with the requested data (or an error), for example. The response is forwarded to client 410A via application server 404A and webtop server 408.

Thus, when transactions (e.g., an HTML form is submitted with search criteria) are requested by clients 410A–410C, 420A–420C and 430A–430C, the transactions are not processed by webtop servers 408, 418 and 428 respectively. Instead the transaction requests are forwarded to application servers 404A, 404B, and 404C respectively. When the requested information has been located, the information is then transmitted back to clients 410A–430C for display.

Webtop Server

Figure 5:
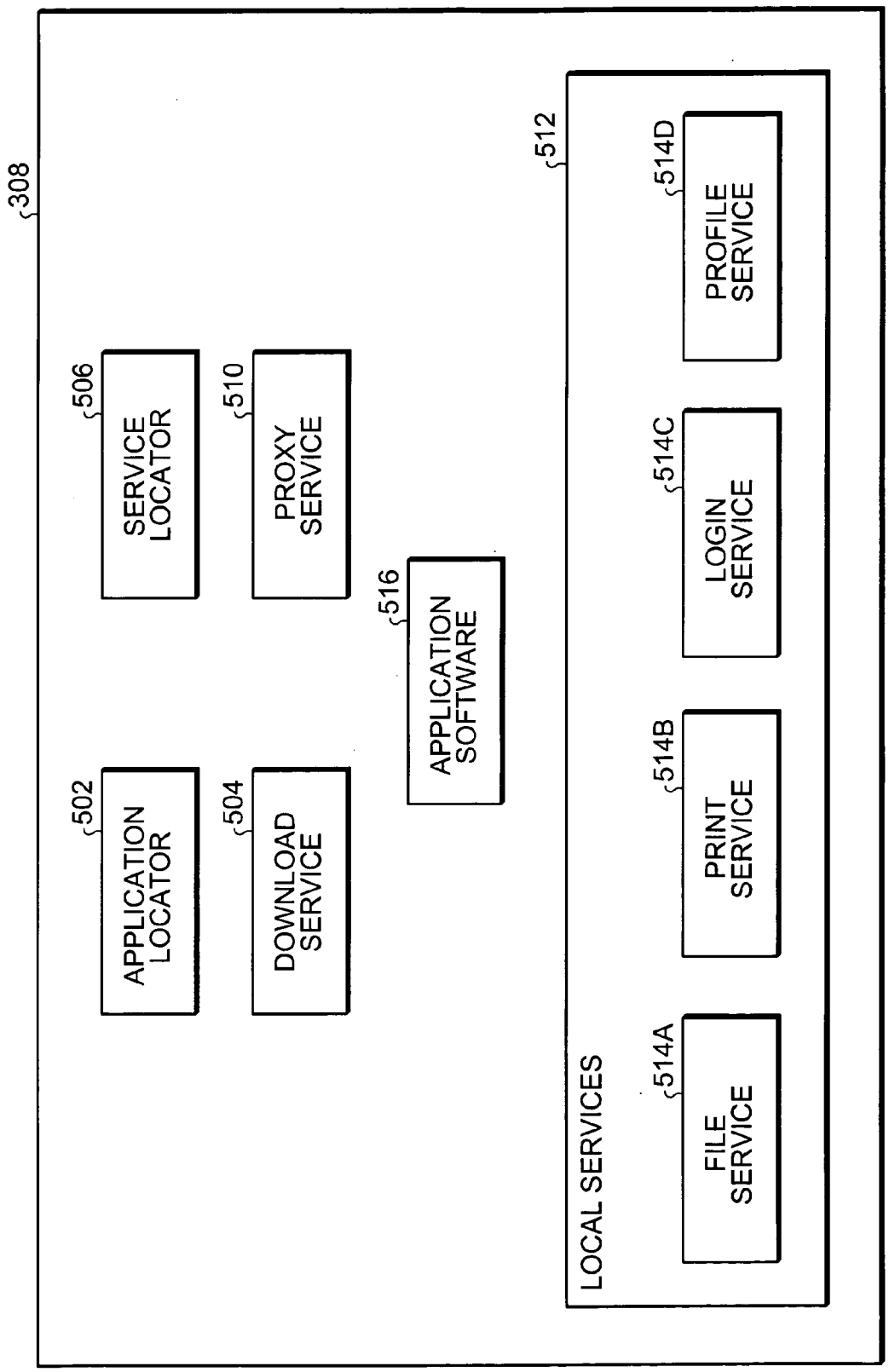
FIG. 5 provides an illustration of a webtop server according to an embodiment of the invention.

Webtop server 308 includes a service locator, cached applets and servlets, and local services. Examples of local services include file system, print, login and profile services which will be discussed in more detail below. FIG. 5 provides an illustration of a webtop server according to an embodiment of the invention.

Referring to FIG. 5, webtop server 308 includes application locator 502, download service 504, service locator 506, proxy services manager 510, local services 512 (e.g., file service 514A, print service 514B, login service 514C, and profile service 514D) and application software 516. Application software 1516 comprises software that is cached at webtop server 308. The following provides a discussion of components of webtop server 308.

Login and Profile Services

In one or more embodiments of the invention, a login service (e.g., login service 514C) runs on webtop server 308 to log in a client and verify the client's login information (e.g., login identification and password). Login service 514C can further create a cookie to track the client session. A cookie is, for example, an item or items of information that is stored on the client and accessed by software that is running on the client (e.g., a browser). A cookie is typically stored as a text file, however, it can be retained using other storage mechanisms.

In one or more embodiments of the invention, login service 514C maintains, on webtop server 308, the client's profile that contains information about the client. Profile service 514D examines the profile to obtain information about the client. For example, profile service 514D can examine a/client's profile to determine whether the client is able to connect to other systems on the network from an applet which is downloaded from webtop server 308. This occurs when, for example, the client trusts webtop server 308 as a trusted server. A client's profile can further include, for example, an identification of the protocols (e.g., RMI) supported by the client.

Profile service 514D can examine a client's profile information to identify and create a start page (e.g., an initial page that displays in client tier 102) once the client has successfully logged in. The initial screen is transmitted to client tier 302 for display by browser 306 in client tier 302.

In an embodiment of the invention, login service 514C is used to generate a credential that can be used on behalf of the client to verify the client to an application or network service. When the client wishes to access an application or network service, the credential is sent to the application or network server. The application or network server trusts the credential generated by login service 514C after verifying the signatures of login service 514C. The credential can be used to enable a client to enter a single login for all of the applications and/or network services that it accesses.

Login service 514C generates a credential certificate upon request of the client. It is not necessary for the credential certificate to contain the client's password. The credential certificate is sent by the applet to the network service or application. The network service or application verifies the signature(s) generated by login service 514C using the credential certificate.

Application Locator

Application locator 502 is used in one or more embodiments of the invention to locate application program software (e.g., applets). Application program software may be written in any programming language including but not limited to the Java programming language, HTML, and the Java scripting language. Application software that is not already cached on webtop server 308 is stored on an application server (e.g., application server 310) that is typically located in a central production center. Application locator 502 consults a directory to locate the application server that contains the requested application software. Once the applet is located, download service 504 acquires the application software for storage on webtop server 308.

The application software that is stored on webtop server 308 can be downloaded to client tier 302 from webtop server 308. Webtop server 308 becomes the host server for the application software that is downloaded to client tier 302. Thus, under the sandbox security model, the application software executing on the client can send requests to webtop server 308.

Application locator 502 can further verify that the application software that is cached on webtop server 308 is the current version of the software.

The directory information that application locator 502 can contain versioning information that application locator 502 can examine to determine whether the cached version of the software is the most recent version of the application software. If a more recent version exists, download service 504 can access application server 310 to obtain the current version of the application software. Because webtop server 308 maintains the most recent version of the application software, the client receives the current version of the application software.

A broadcast message technique can be used as an alternative to webtop server 308 examining the directory to determine whether it has the most recent version of application software. For example, when an applet is changed, a broadcast message can be sent across the network. The broadcast message can be sent out to all instances of webtop server 308 or only those instances that have registered to receive such a message. When a broadcast message is received by webtop server 308, it can respond by obtaining the new version. Download service 504 can respond by acquiring the changed application software from the application server on which the newer version resides for storage on webtop server 308, for example.

Thus, application server 310 can notify webtop server 308 when a change occurs in application code. Alternatively, webtop server 308 can contact application server 310 to determine whether the application code has been updated. Application server 310 can keep track of all changes to application software. When contacted by webtop server 308, application server 310 examines its set of changes and respond to webtop server 308. If application server 310 indicates that application code has changed, webtop server 308 can request an updated copy of the application code.

To request application software, the client need only reference application locator 502 on webtop server 308 and identify the requested application software by name, for example. There is no need for the client to remember a URL for the requested application software. Application locator 502 accesses the directory to translate the name provided by the client into a identifier (e.g., a URL) for the application software.

Service Locator

Application software that is running on a client can request a service (e.g., file system or print services). When a service request is received by webtop server 308, service locator 506 is used in one or more embodiments of the invention to locate a local or network service to satisfy the request. It is not necessary for the application software to be aware of the location of the network or local service. Thus, a network or local service can be moved without impacting the applet code.

To illustrate, an applet (or other application software) running in client tier 302 submits a request for a service via communication link 322. The request is received by service locator 506 which proceeds to find the requested service.

If the service can be transferred to webtop server 308, download service 504 acquires the service from the server on which it resides. If not, service locator 506 acquires a proxy on webtop server 308 that acts as a conduit for transmissions between the client and the requested service.

In one or more embodiments of the invention, services are written in the Java programming language (or any other programming language) and are referred to as servlets. Sun Microsystems, Inc.'s Webserver™, as well as other servers, support the use of server-side programs (servlets) that may be written in the Java programming language (or other programming language). A Java Servlet API is available from Sun Microsystems, Inc. that includes abstract classes that can be subclassed to create a servlet.

Where it is possible for an application software's request to be satisfied by more than one service, service locator 506 can choose based on each, service's respective loads. Thus, service locator 506 can perform load balancing across the services. A discussion of load balancing is provided below.

Resource Locator/Handler

Figure 9:
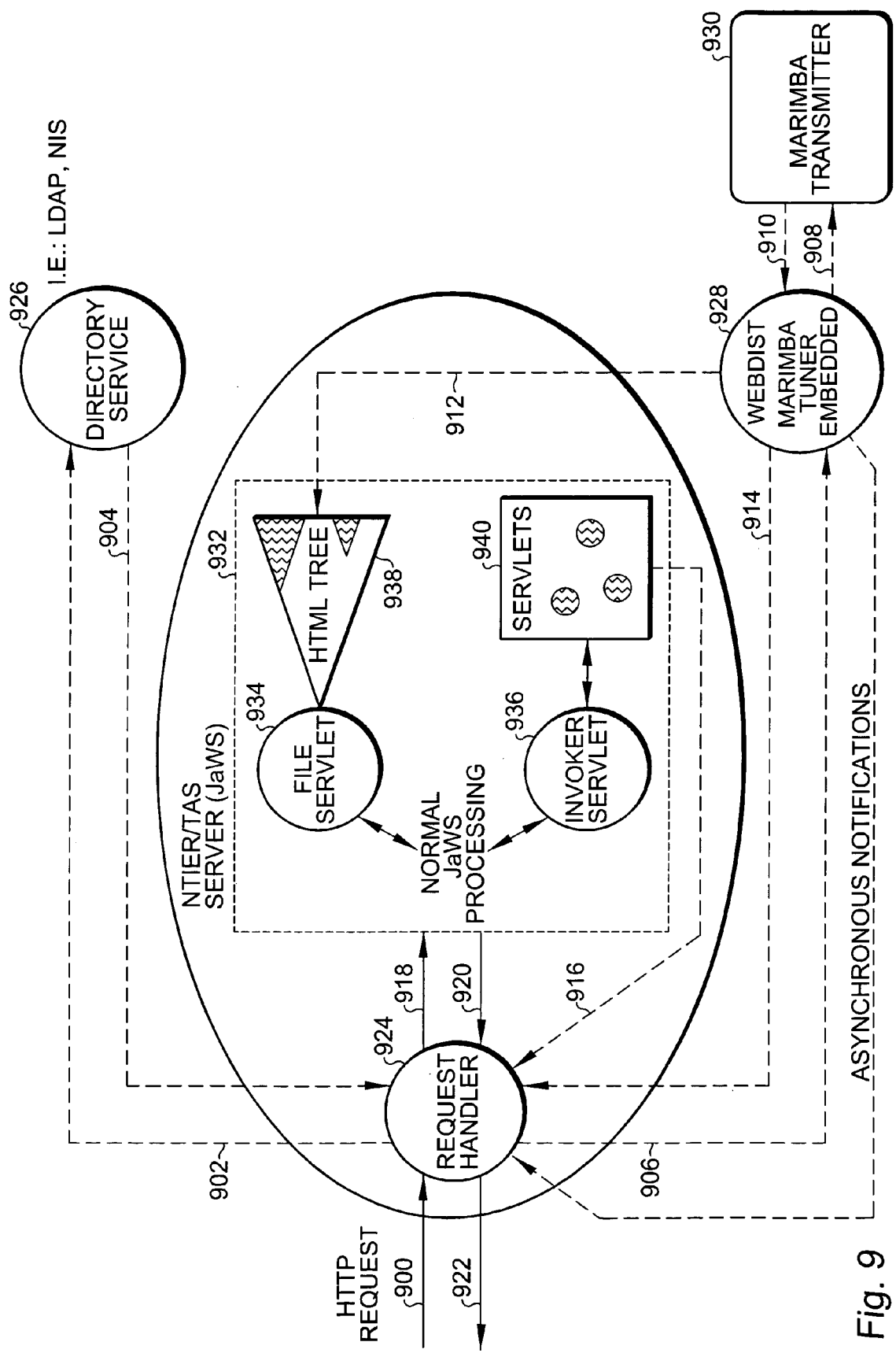
FIG. 9 provides an illustration of a web top server and a request handler according to one or more embodiments of the invention.

As an alternative to Application Locator 502 and Service Locator 506, FIG. 9 illustrates an embodiment of the invention with Request Handler 924 (also referred to as a Resource Handler). Resource Handler 924 has many responsibilities with respect to processing client requests. Resource Handler 924 must ensure that the files and applications needed pursuant to a request by the client are installed and running. Additionally, resource handler 924 is responsible for maintaining the most current version of the information and application and releasing unused disk space from webtop server 932.

Processing by resource handler 924 commences upon receiving a client request 900 from a client using a standard internet browser such as Navigator available from Netscape or Internet Explorer available from Microsoft. Resource handler 924 checks to determine if the request is an application or transaction request (e.g., if the URL (Uniform Resource Locator—the language used to specify the information to be transmitted via the internet) starts with "http://<HOST>/app/" or is an HTML form). If the request 900 is not an application or transaction request, resource handler 924 passes the request 918 to the webtop server 932 for processing as described above. Webtop server 932 processes the request and transmits the response 920 back to request handler 924 where it is forwarded 922 to the client via HTTP for example. If the request 900 is an application request, request handler 924 determines if the request is locally available. If the request is locally available, request handler 924 forwards the request 918 to webtop server 932 for processing.

If the application is not locally available, request handler 924 checks 904 with an information base such as directory service 926 (or a database or other repository of information) to determine if the application exists and its location (e.g., with the Castanet technology, request handler 924 checks with the directory service to determine if the application channel exists). Directory service 926 provides the results 902 to request handler 924. If the requested information does not exist or is not listed with directory service 926, an ERROR message may be provided to the client via path 922. Once the location of the requested application is provided by directory service 926, request handler 924 requests 906 the WebDist 928 module to obtain the application. WebDist module 928 may contain the Castanet tuner (or a device configured in the DRP protocol) to receive the relevant information from a Castanet transmitter 930 (or DRP transmitter) located on an application server, for example. Consequently, the WebDist module 928 may request the information 908 from Castanet (or DRP) Transmitter 930 which then provides the information 910 back to the Castanet (or DRP) Tuner located within the WebDist module 928.

Once retrieved, the WebDist module 928 may store the relevant information 912 in the HTML directory structure 938 of webtop server 932. WebDist module 928 may then notify the request handler 924 that the application is ready for retrieval and transmission to the client. The notification may be synchronous or asynchronous. If asynchronous, the user will be notified the application is being obtained and a re-request may be performed automatically in a few seconds.

When information is transmitted to WebDist 928, a properties file is also provided. The properties file specifies all additional information and dependencies that are needed for the application to run. For example, one application may need another application to properly run. This properties file is provided via path 914 to request handler 924 for processing. Request handler 924 examines the properties file and if additional resources (e.g., files, information, or applications) are needed, request handler 924 requests WebDist 928 to retrieve the appropriate resource. The properties file consists of the name of the channel or application being provided, the owner of the channel/application, and any dependencies (e.g., other channels needed to use the current channel and information regarding how to retrieve the needed channel.

Once the necessary information is installed in the HTML tree (also referred to as HTML directory structure) 938, request handler 924 provides the information necessary to load the necessary servlets 940 to webtop server 932. Webtop server 932 then installs the necessary servlets 940 using the invoker servlet 93&. For example, a servlet located in a JAR file may need to be started up in order to process the HTTP request or run the CGI script requested by the client. In this manner, the servlets are loaded dynamically within the webtop server or proxy when they are needed.

Disk space on a webtop server may be limited. Since the request , handler 924 is responsible for maintaining and updating the necessary files, request handler 924 may request WebDist to remove specific files that are no longer used or needed by webtop server 932. Alternatively, WebDist 928 may determine that additional space is necessary and ask request handler 924 which files and resources it can remove.

Figure 10:
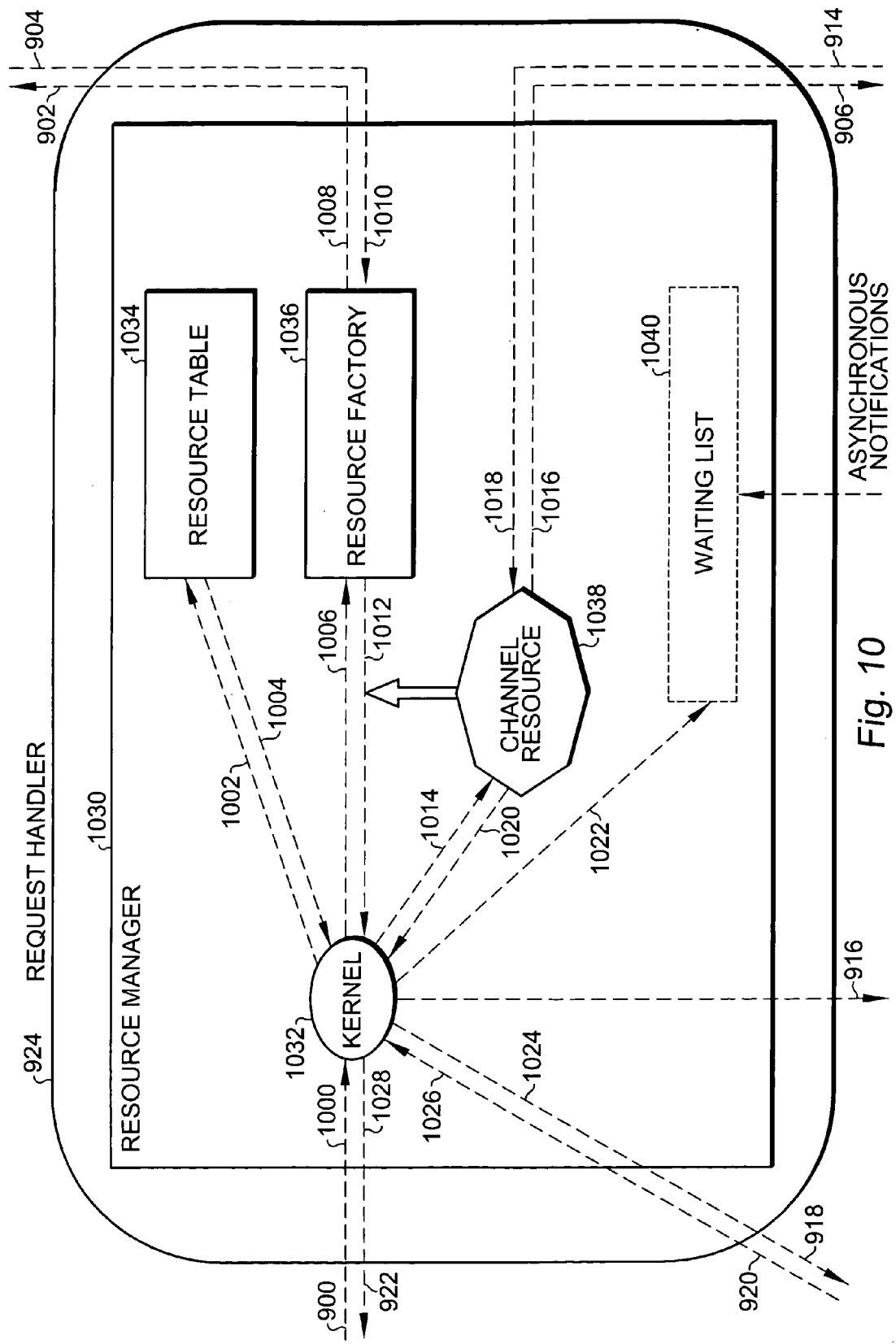
FIG. 10 provides an illustration of a resource handler according to one or more embodiments of the invention.

FIG. 10 illustrates the elements of request handler 924. In one or more embodiments, request handler 924 consists of a resource manager 1030 which contains kernel 1032, resource table 1034, resource factory 1036, channel resource 1038 (if Castanet technology is used) and waiting list 1040. Request Handler 924 receives the request 1000 at kernel 1032. Kernel 1032 determines if it is an application request. If it is an application request, kernel 1032 determines if the resource is available and ready by examining resource table 1034 via paths 1002 and 10004. If the resource is available and ready, kernel 1032, forwards the request to the webtop server 932 via paths 1024 and 918. The result is returned via paths 920 and 1026 to kernel 1032 and to the client via path 1028 and 922. If the resource is not available and ready, kernel 1032 requests resource factory 1036 to synthesize the resource 1006. Resource factory 1036 checks with directory service 926 to determine if the resource exists via paths 1008, 902, 904, and 1010. If the resource does not exist, an ERROR message is returned to the client via paths 1012 and 922.

If the resource exists, kernel 1032 adds the resource to the resource table 1034 and the-resource is prepared 1014 by requesting the WebDist module 1020 to make the resource locally available 1018. If the resource is prepared and locally available 1020, kernel 1032 requests the webtop server 932 to load the necessary servlets 1022. Processing continues as described above. Alternatively, the resource may not be immediately loaded or available (e.g., it is being used by another application or is being retrieved from an application server), and will be placed on waiting list 1040. Once the resource is loaded and available, notification of the resource's availability may be sent to the client. The notification may be synchronous or asynchronous. Further, the resource may remain on the waiting list in a "preparing" state until all of the resource's dependencies are retrieved, loaded, and available.

By utilizing the request handler in this manner, the webtop server is the real application server from the perspective of the client.

Directory Service

Service locator 506 and application locator 502 (and request handler 924) locate a service (or services) and application code (respectively) when webtop server 308's current configuration cannot satisfy a request. In one or more embodiments of the invention, a directory service (also referred to as an information base, a database, or repository of information) can be accessed, for example, to locate a service or an application's program code.

A directory service can be centrally located or distributed at various geographical areas. A distributed directory service can comprise entries for all geographical areas, or those for a particular area. A replication mechanism can be used to replicate entries to each of the distributed directory services such that each directory service comprises all entries, for example.

A directory service receives and processes locator requests. A directory service maintains a store of information that contains an entry for each service or application code that is registered with the directory service. This store is referred to herein as a directory. When a new service or application is installed, an entry is added to the directory by the directory service. The new service or application may also be added to the resource table 1034. Entries can also be deleted from the directory or resource table when, for example, a service or application is no longer available.

With respect to a service, a directory entry associates a service name with the location of the service. Similarly, a directory entry can identify an application's program code by its name. The location can be expressed in terms of a URL in one or more embodiments of the invention. Service locator 506 or application locator 502 queries the directory service using the name of the service or application (respectively). The directory service queries the directory for a service or application code with that name. The directory service returns the location of the service(s) or application code, or an error, if the directory does not contain an entry with the name.

Proxy Services

In some cases, a service cannot be transferred to webtop server 308. In this case, webtop server 308 can transfer a proxy for the service. A service may, for example, process secure information and must therefore be executed in a secure environment such as application server 310. The service's proxy forwards the client's request to the service that is running on application server 310.

If a proxy is copied to webtop server 308 instead of the service, webtop server 308 creates a handle for the proxy. The proxy's handle is forwarded to the client. The client is unaware that the handle is to a proxy and not the actual service. The client submits a request to the service via the service's proxy using the proxy's handle. When the request is received by webtop server 208, it is given to the service's proxy. The service's proxy forwards the request to the service.

If the service generates a response to the request that is to be transmitted back to the client via the proxy. The service sends the response to the proxy on webtop server 308. The proxy forwards the response to the client.

Figure 6:
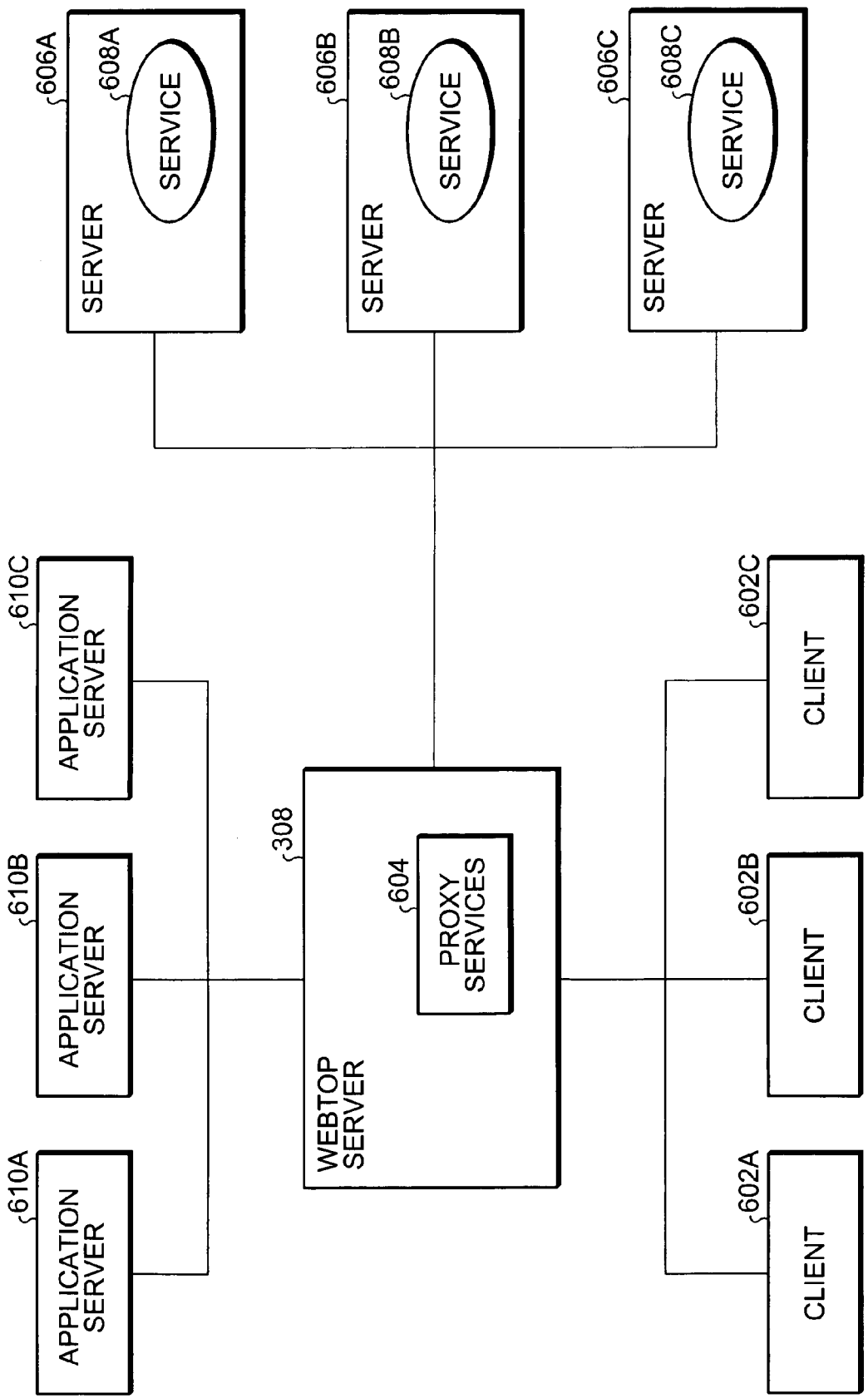
FIG. 6 illustrates the use of proxies for connecting multiple clients to multiple servers according to an embodiment of the invention.

FIG. 6 illustrates the use of proxies for connecting multiple clients to multiple servers according to an embodiment of the invention. Proxy services 604 of webtop server 308 comprises proxies that can act as a conduit for communications between multiple clients and multiple application servers. That is, for example, a proxy can connect clients 602A–602C and applications servers 610A–610C. Further, proxy services 604 can be used to connect clients to servers other than application servers 610A–610C. Thus, clients can use services that reside on different servers. Clients 602A–602C can access services on servers 606A–606C, for example.

A credential certificate generated by login service 514C can be sent to a network service (e.g., services 608A–608B). The network service trusts the credentials supplied by login service 514C after it verifies the signatures of login service 514C. The client need only enter a single login (i.e., with login service 514C) to access multiple applications and network services.

Local Services

Services that are resident on webtop server 308 are local services. For example, local services are those services that permanently reside on webtop server 308, or are copied to webtop server 308 in response to a request by the client. Referring to FIG. 5, login service 514C and profile service 514D are examples of services that typically reside permanently on webtop server 308. If these or other services are not resident on webtop server 308, they may be transferable to webtop server 308 as described herein. Other examples of local services are file service 514A and print service 514B.

A client forwards a request for a handle to a service to webtop server 308. If the service is local to webtop server 308, the handle is forwarded by webtop server 308 to client. The client can access the service using the handle. Responses generated by a local service are forwarded by webtop server 308 to the client.

Load Balancing

Service locator 506 and proxy services 510 can perform load balancing according to an embodiment of the invention. Where service locator 506 is aware of more than one service that is capable of satisfying a service request, service locator 506 can balance the processing load between the services. For example, service locator 506 can select a service based on which of the services received the last request. That is, service locator 506 can assign requests to each of services in a sequential, cyclical manner (e.g., a round robin assignment) to balance the load across all of the services that are capable of satisfying the service request.

Similarly, proxy services 510 may be aware of multiple services that can satisfy a request. Proxy services 510 can act as the proxy for multiple services. Therefore, proxy services 510 can distribute service requests to the services for which it acts as a proxy to balance the request processing load. For example, proxy services 510 can assign service requests using a round robin technique.

Using the above services in a local server architecture according to one or more embodiments of the invention provides many advantages. A request for information, such as application code (e.g., an applet) by a client, can be serviced by the local application server with its existing configuration or a new configuration. Further, by using the local server, it is possible to access local resources in an efficient way from the local server without using signed applets (which requires a costly infrastructure and certificates management). Thus, all of the applets are downloaded from the local server regardless of the application server. Proxies are installed in the local server and communicate with the application servers. Therefore, it is possible for applets to share services in the network using the proxies downloaded in the local server. Further, because the user downloads all of the applets from the local server, the application server locations and URLs are transparent to the user, and from the user perspective, all applications are local.

Consequently, from the applet perspective, all services are available on the local server, and the resource locator/handler (discussed below) running in the local server downloads the proxies for the actual services and makes the locations transparent for the applet. In addition, since the applet is obtaining all services from the local server, a signed applet infrastructure is not required.

Acquisition Process

Figure 7:
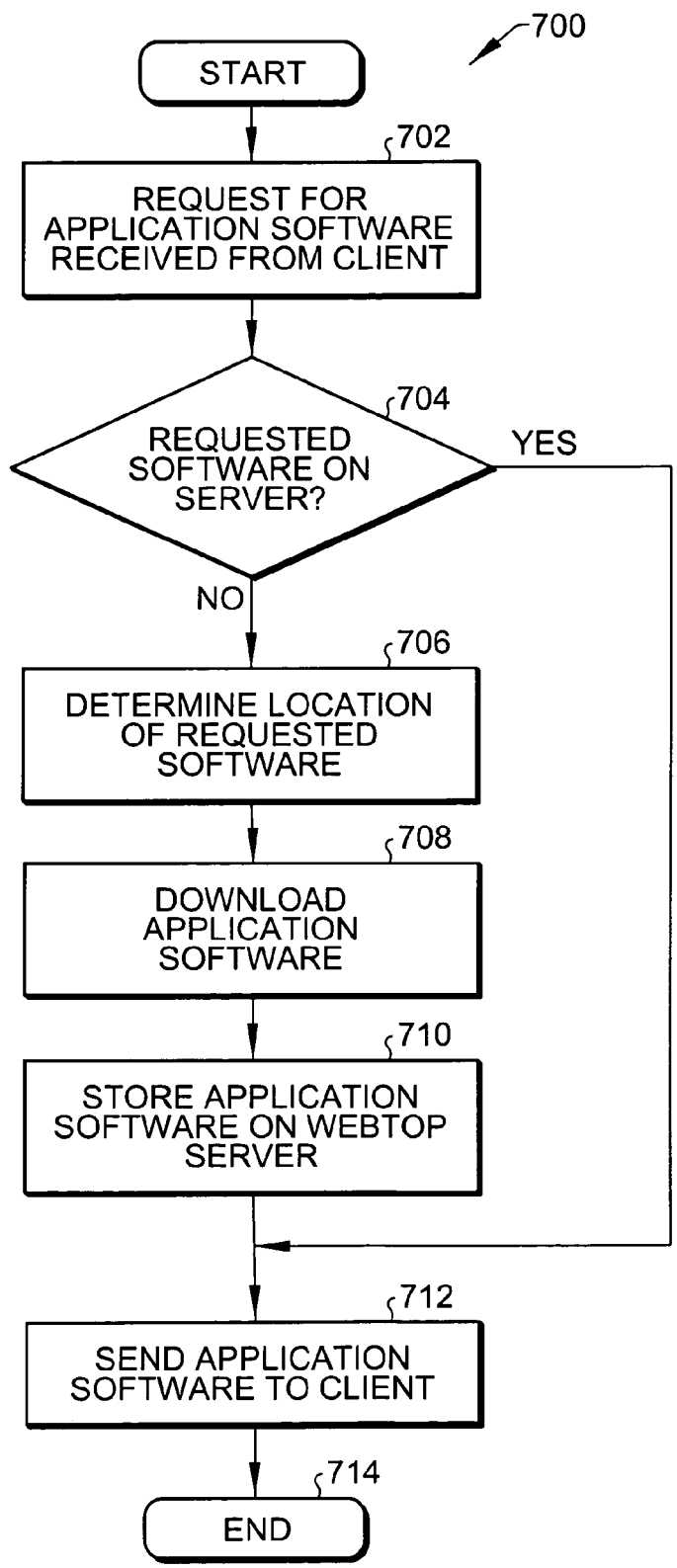
FIG. 7 provides a application software acquisition process according to an embodiment of the invention.
Figure 8:
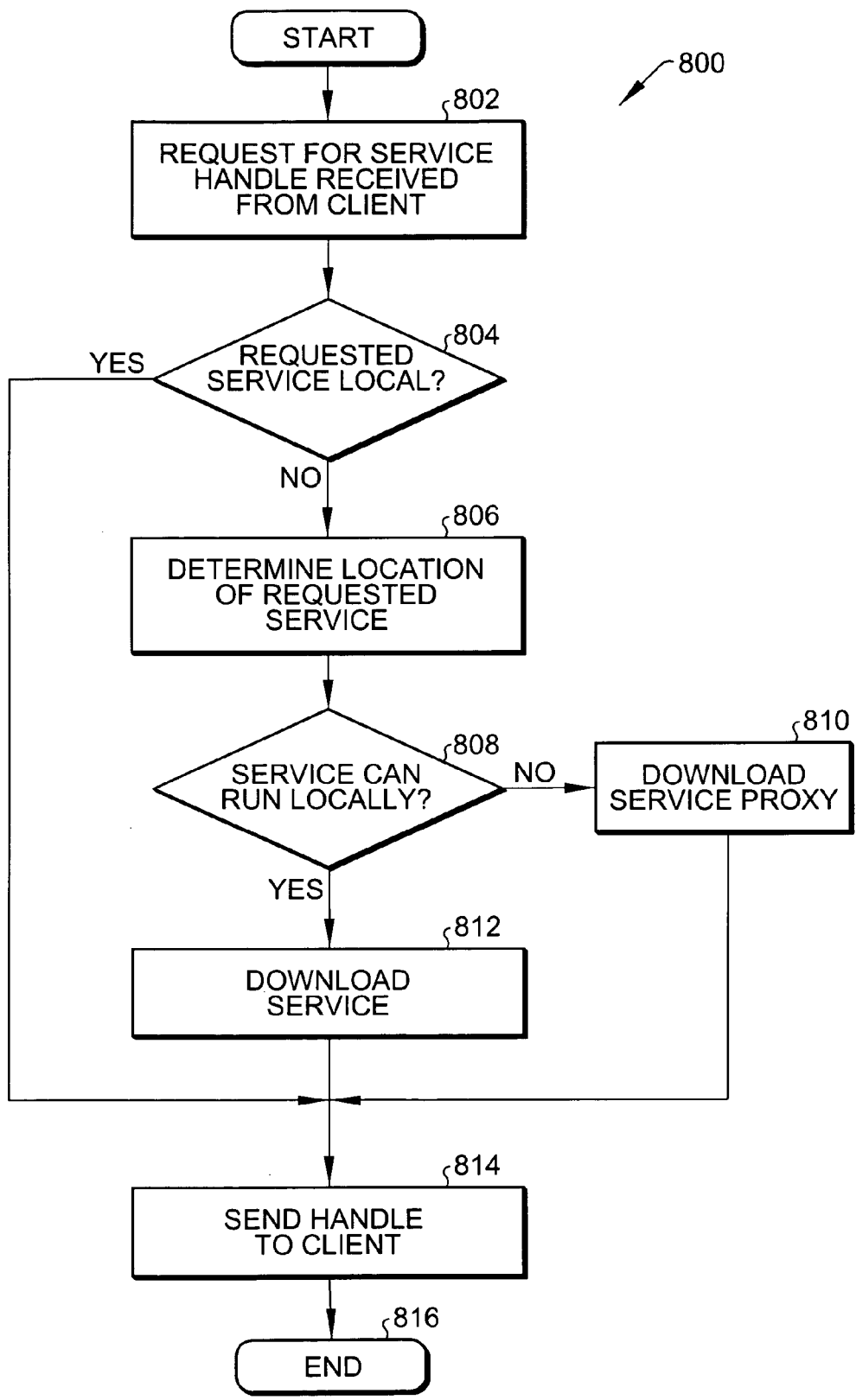
FIG. 8 provides a service acquisition process according to an embodiment of the invention.

Application software and services can reside on webtop server 308 for local access by a client. If the application software and/or services do not already reside on webtop server 308, they can be downloaded for use by the client. FIGS. 7 and 8 provide process flows for acquiring the application software and services, respectively, according to embodiments of the invention.

Referring to FIG. 7, a request for application software is received from the client at step 702. At step 704, webtop server 308 determines whether the software is cached on the server. If so, processing continues at step 712 to send the requested application software to the client and processing of the software request ends at step 714.

If the requested software does not reside on webtop server 308, processing continues at step 706 to determine the location of the software. Webtop server 308 consults an information base (e.g., database, directory service or other repository of information) that can reside at a local, regional or centralized site, for example, to determine the location of the requested software. In one embodiment of the invention, the client identifies the requested software by name, for example. It is not necessary for the client to know the exact location of the requested software. However, if the location is known by the client (e.g., in the form of a URL), the client can submit this information to webtop server 308.

Using the location information obtained for the requested software, webtop server 308 sends a request to the application server on which the requested software resides (application server 310). If necessary, webtop server 308 can provide a credential so that the request can be verified by the application server. At step 710, the application software that is transferred from the application server is cached on webtop server 308. Further, any dependencies of the application software are transferred and cached on webtop server 308. At step 712, the requested application software is, forwarded to the client and processing of the software request ends at step 714.

Similarly, the client can request a service (e.g., print or file service). If the service is local to webtop server 308, a handle for the service can be sent to the client. If the service is not local, webtop server 308 attempts to download the service/for use locally by the client. If the service cannot be obtained or there is no gain (e.g., efficiency gain), webtop server 308 obtains a proxy for the service and a proxy handle is sent to the client. FIG. 8 provides a service acquisition process according to an embodiment of the invention.

At step 802, a request for a service handle is received from the client. At step 804, webtop server 308 determines whether the service is already local (or resident on webtop server 308). If so, processing continues at step 814 to return a handle for the service to the client and processing of the service request ends at step 816.

If the service is not local to webtop server 308, processing continues at step 806 to determine the location of the requested service. Webtop server 308 consults an information base (e.g., database, directory service, or other repository of information) that resides at a local, regional or centralized site, for example, to determine the location of the requested service.

At step 808, a determination is made whether the service can run locally on webtop server 308. If, for example, the service must run in a secure environment of another server, the service cannot be copied to webtop server 308. Further, if the service must interact with other services that cannot be copied to webtop server, there is little benefit to obtaining a copy of the service. In these cases, webtop server 308 does not download the service, but requests a proxy for the service at step 810. If webtop server 308 determines that the service is transferable, it requests a copy of the service at step 812.

At step 814, a handle to the service of the service's proxy is sent to the client. Processing of the service request ends at step 816.

Servlet Security

In one or more embodiments of the invention, a security model is implemented whereby an applet's status as trusted or untrusted indicates the degree of access to resources given to the applet. An untrusted applet is limited to its own namespace, for example. A trusted applet can have access to resources (e.g., memory) outside of its namespace. Since servlets (like applets) can be copied from trusted servers as well as untrusted servers, a security approach can be used to ensure that servlets cannot cause harm to computer resources.

In one embodiment of the invention, webtop server 308 limits the acquisition of servlets such that servlets are only obtained from trusted servers. A servlet that is obtained from a trusted server is considered to be a trusted servlet and may be given access outside the sandbox (e.g., outside of its own namespace).

In another embodiment of the invention, webtop server 308 allows servlets to be obtained from both trusted and untrusted servers. To verify an untrusted servlet, webtop server 308 can require that a servlet obtained from an untrusted server be signed with a signature of an authorized person. The signature is verified before the servlet is considered to be a trusted servlet. If a servlet is obtained from an untrusted server, it is considered to be untrusted unless it has a signature that has been verified. As with an untrusted applet, an untrusted servlet is limited, in its access, to its own namespace. That is, an untrusted servlet is run inside the sandbox.

Thus, an enterprise computing environment has been provided in conjunction with one or more specific embodiments. The invention is defined by the claims and their full scope of equivalents.

The invention claimed is:

1. A method of computing in a networked environment comprising:
   receiving, at a request handler on a local server in a local server tier, a request from a client tier;
   the request handler determining whether the request can be satisfied using software resident on the local server in the local server tier;
   performing the following if the request cannot be satisfied by software resident on the local server in the local server tier:
      the request handler consulting an information base to determine a location of new software to satisfy the request, wherein the new software is located on two or more application servers located in an application tier;

the request handler choosing the new software from one of the application servers based on a load for each of the application servers;
the request handler acquiring the new software from the chosen application server; and
the request handler loading and retaining a copy of the new software on a local server in the local server tier;
wherein the acquiring the new software comprises obtaining a properties file for the new software, the property file comprising additional information and dependencies useful in running the new software, and wherein the method further comprises examining the properties file and based on the examining, retrieving a resource for use by the local server in running the new software.

2. The method of claim 1, wherein the request is for application software, the method further comprising generating a persistent copy of the application software on the local server.

3. The method of claim 1, further comprising transmitting the software from a local server to the client.

4. The method of claim 1, further comprising establishing a Castanet tuner on a local server and a Castanet transmitter on an application server.

5. The method of claim 1, wherein the request handler automatically maintains a most recent version of the software on the local server.

6. The method of claim 1, wherein the new software is acquired using one of a group consisting of a Castanet product and a distribution and replication protocol.

7. The method of claim 1, wherein the local server consults a directory that contains information indicating whether the application software on the local server is the most recent version of the application software.

8. The method of claim 1, wherein the application server automatically notifies the local server of any changes to software downloaded from the application server.

9. The method of claim 1, wherein the step of the request handler acquiring the new software from an application server located in an application tier to the local server from the location further comprises acquiring any dependencies for the new software.

10. The method of claim 1, wherein the new software is not used to modify preexisting software on the local server.

11. A configurable server comprising:
a processor; and
a request handler coupled to the processor configured to manage resources needed to satisfy a request by a client using local information and information residing on a remote server, wherein the request handler determines whether the request can be satisfied using software resident on a local server in a local server tier;
wherein if the request cannot be satisfied by software resident on a local server in a local server tier, the request handler performs the following:
consults an information base to determine a location of new software to satisfy the request;
determines whether any additional software is needed for the new software to run properly;
acquires the new software and said any additional software from an application server located in an application tier; and
dynamically loads and retains a copy of the new software and said any additional software on the local servers;
wherein said acquires the new software and said any additional software comprises obtains a properties file for the new software, the property file comprising additional information and dependencies useful in running the new software, and wherein the method further comprises examining the properties file and based on the examining, retrieving said any additional software for use by the local server in running the new software.

12. The server of claim 11 wherein the request is for application software, and wherein the request handler generates a persistent copy of the application software on the local server.

13. The server of claim 11, wherein the local server transmits the software to the client.

14. The server of claim 11 wherein the local server comprises a Castanet tuner and the application server comprises a Castanet transmitter.

15. The server of claim 11, the request handler further configured to automatically maintain a most recent version of the new software on the local server.

16. The server of claim 11, wherein the new software is acquired using one of a group consisting of a Castanet product and a distribution and replication protocol.

17. The server of claim 11, wherein the local server consults a directory that contains information indicating whether the application software on the local server is the most recent version of the application software.

18. The server of claim 11, wherein the application server automatically notifies the local server of any changes to software downloaded from the application server.

19. The server of claim 11, wherein the new software is not used to modify any preexisting software.

20. The server of claim 11, wherein the new software is located on two or more application servers, and the request handler acquires the new software for one of the application servers based on a load for each of the application servers.

21. The server of claim 11, wherein the request handler automatically maintains a most recent version of the additional software on the local server.

22. A method of computing in a networked environment comprising:
receiving at a server an application request from a client, the server being local to the client;
determining whether an application specified in the application request is available locally on the local server;
satisfying the application request if the application request can be satisfied by the local server with a locally available application; and
performing the following if the application request cannot be satisfied with the locally available application;
consulting an information base to determine whether the specified but not locally available application is available remotely and if so, determining a location of the specified but not locally available application;
obtaining the specified but not locally available application from an application server identified by the location, the application server being located remote to the local server in an application server tier;
saving the obtained application returned from the application server in storage associated with the local server; and
satisfying with the local server the application request by the client;
wherein the obtaining of the specified application comprises obtaining a properties file for the specified application, the properties file comprising additional information and dependencies useful in running the specified application, and wherein the method further comprises examining the properties file and based on the examining, retrieving a resource for use by the local server in running the specified application.

23. The method of claim 22, wherein the resource comprises an additional application.

24. The method of claim 23, further comprising loading the additional application on the local server prior to the satisfying the application request.

* * * * *